Patented Sept. 13, 1938

2,130,240

UNITED STATES PATENT OFFICE 2,130,240

PROCESS OF PRODUCING MAGNESIA AND NITROGENOUS FERTILIZERS FROM DOLOMITE

Otto Kippe, Osnabruck, Germany, assignor to Klöckner-Werke A.-G., Castrop-Rauxel, Germany No Drawing. Application September 21, 1934, Serial No. 744,962. In Germany October 2, 1933

2 Claims. (Cl. 71—60)

This invention relates to a process of producing magnesia and nitrogenous fertilizers from dolomite, and has for its object to improve the known processes, all of which require complete or partial calcination of the dolomite as well as slaking and sifting thereof to obtain a magnesia sufficiently poor in lime.

The artificial production of pure magnesia is of special importance for the reason that the workable natural deposits of pure magnesite are very limited in extent and also, as a rule, far removed from the industrial establishments needing this substance.

Under the known processes of artificially producing magnesia from universally available raw materials, particularly from the bicarbonate of lime and magnesia, that is dolomite, it has been possible only lately to attain results that are somewhat satisfactory from a technical and economic point of view by procuring calcium nitrate besides magnesia. In accordance with these processes, the dolomite was dissolved in nitric acid and the magnesium hydroxide precipitated from the solution by means of dolomite milk, or the dolomite was calcined, slaked, and the lime separated from the magnesium hydroxide by means of nitric acid.

All known processes, however, as stated above, require calcination, slaking and sifting of the dolomite to obtain as final product magnesia that is sufficiently poor in lime.

The process proposed by the invention eliminates these difficulties and consists in dissolving the dolomite in nitric acid, precipitating the magnesium hydroxide by ammonia, separating the precipitate by filtration and converting the ammoniacal filtrate into fertilizers by evaporation or treatment with carbonic acid. This process is based on the surprising observation that the magnesia in the form of magnesium hydroxide can be completely and lime-free precipitated from a solution of dolomite in nitric acid by means of ammonia, and affords also a highly profitable opportunity of converting the filtrate into a nitrogenous fertilizer of great value.

It was the prevailing opinion up to this time that solutions of magnesium salts could be precipitated only incompletely by means of ammonia, as soluble ammonium magnesium salts would form besides magnesium hydroxide which is known not to be precipitated in the presence of ammonium salts. In pure solutions of magnesium chloride or magnesium sulfate the precipitation of magnesium hydroxide may be increased to 70%–80% by the excessive application of ammonia. It was therefore not to be expected that by dissolving dolomite in nitric acid, whereby magnesium nitrate is obtained and, besides, this is in the presence of calcium nitrate, and by adding ammonia any magnesium hydroxide would be precipitated at all and that, by adding ammonia in excess, the precipitation would be complete.

According to the invention, magnesia and nitrogenous fertilizers can now be obtained in a much simpler manner than before and without any calcination of the dolomite.

The following examples show the application of the process:

Example 1

Dissolve 250 g. crude dolomite containing 34% CaO and 18% MgO as carbonates in 750 cm$^3$ nitric acid 1.23 and introduce, while stirring and cooling, 90 g. ammonia gas. The separated magnesium hydroxide is then filtered, washed, dried and, if desired, converted into magnesia by calcining. The yield will be 70 g. precipitated in pure magnesium hydroxide which, when calcined, results in 47 g. lime-free magnesia. The filtrate containing calcium in the form of calcium nitrate and, in addition, ammonium nitrate and free ammonia can be directly evaporated by being heated to 140° C. to recover the free ammonia. The residue amounting to 460 g. will solidify during cooling and form a crystalline mass consisting of 35% ammonium nitrate and 65% Ca(NO$_3$)$_2$.2aq, and thus represent a calcium nitrate containing 35% ammonium nitrate.

The crude dolomite not being chemically pure, the resultant precipitate is not chemically pure, and the actual experimental values given above therefore are not in exact accord with theoretical calculations.

The ammoniacal filtrate separated from the magnesium hydroxide may further be profitably treated in known manner with carbonic acid produced during the dissolution of the crude dolomite in nitric acid. Such treatment will result in the production of calcium carbonate and ammonium nitrate which either are dried together or separately obtained after separation by filtration. The fertilizer obtained will then be calcium-ammonium nitrate with a yield, in the example described, of 150 g. calcium carbonate, free from MgO, and 410 g. ammonium nitrate of 99.2%, wherefrom the desired mixtures may be easily produced.

It is further possible, by adding smaller amounts of ammonia, to produce besides magnesia, nitrogenous fertilizers which contain magnesium nitrate in addition to calcium nitrate and ammonium nitrate, as suggested in the following:

Example 2

Dissolve 250 g. crude dolomite in 750 cm³ nitric acid and, while stirring and cooling, introduce 45 g. ammonia or mix with 185 cm³ of 25% ammonia. The precipitated magnesium hydroxide is then filtered, dried and calcined. The yield will be 50 g. magnesium hydroxide which when calcined, results in 30 g. magnesia.

The ammoniacal filtrate is evaporated at 140° C. and will solidify during cooling and stirring to form crystalline granulated material.

Yield:
430 g. with 56.9% Ca(NO₃)₂
12.7% Mg(NO₃)₂
30.4% NH₄NO₃

By varying the amount of ammonia any desired magnesia content may be provided in the fertilizer. The technical application of the process according to the invention does not involve difficulties, and it is only necessary to keep the temperature during the introduction of the ammonia below 20° C. if possible, as otherwise the filtration of the magnesium hydroxide will be unfavorably influenced. According to the invention, the magnesia obtained may not only be free from lime but also poor in, or free from, iron, as after the addition of ammonia, ferric hydroxide will precipitate first which may be removed by filtration before the further introduction of ammonia.

The magnesia may further be maintained quite poor in iron by treating the solution of crude dolomite in nitric acid with ground crude dolomite.

The invention is not restricted to the process described in detail and specified in the examples given above, but may be varied in many ways without exceeding its scope.

I claim:

1. A process of producing magnesia and nitrogenous fertilizers from dolomite, which consists in dissolving the dolomite in nitric acid, quantitatively precipitating the magnesium compound as magnesium hydroxide from the solution thus formed by adding an excess of ammonia, separating the precipitate, converting the precipitate into magnesia, and employing carbonic acid developed from dissolving dolomite in nitric acid to convert the filtrate into fertilizers.

2. A process of producing magnesia and nitrogenous fertilizers from dolomite, which consists in dissolving the dolomite in a nitric acid, adding to the solution thus formed ammonia of the approximate quantity necessary to precipitate all of the magnesium as magnesium hydroxide, the actual amount of ammonia used being over 50% in excess of that theoretically required separating the resulting precipitate by filtration to convert the same into magnesia and then treating with carbonic acid while stirring and cooling said precipitate to convert the filtrate into fertilizers.

OTTO KIPPE.